(12) United States Patent
Smink et al.

(10) Patent No.: US 6,385,910 B1
(45) Date of Patent: *May 14, 2002

(54) SWIVEL-SLIDING DOOR SYSTEM FOR A VEHICLE

(76) Inventors: Pieter Smink, Hanenburg 17, 9255 JX Tietjerk; Johan Pieter Hulshoff, Franjumbuorsterpaed 15, 9034 HA Marssum; Bart van der Sloot, Skildyk 11, 9024 EN Weidum; Frans Hesmerg, Kamgras 120, 8935 EP Leeuwarden; D de Roos, Epermastraat 12, 8926 MX Leeuwarden, all of (NL)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/899,961

(22) Filed: Jul. 24, 1997

(30) Foreign Application Priority Data

Jul. 24, 1996 (NL) .............................................. 1003674

(51) Int. Cl.[7] .............................................. E05D 15/10
(52) U.S. Cl. .............................. 49/218; 49/213; 49/209; 49/120
(58) Field of Search ......................... 49/213, 209, 214, 49/215, 219, 218, 118, 116, 120, 362

(56) References Cited

U.S. PATENT DOCUMENTS

| | | | | |
|---|---|---|---|---|
| 1,071,469 A | * | 8/1913 | Scullin et al. ................. | 49/118 |
| 1,139,904 A | * | 5/1915 | Pitts ............................ | 49/118 |
| 1,215,573 A | * | 2/1917 | Otis ............................ | 49/118 |
| 1,335,750 A | * | 4/1920 | Pearson ....................... | 49/118 |
| 1,411,039 A | * | 3/1922 | Lacey .......................... | 49/118 |
| 3,261,128 A | * | 7/1966 | Slopa et al. .................. | 49/118 |
| 3,826,042 A | * | 7/1974 | Daugirdas et al. ............ | 49/213 |
| 4,087,939 A | * | 5/1978 | Elguindy et al. ............. | 49/118 |
| 4,091,570 A | * | 5/1978 | Favrel ...................... | 49/215 X |
| 4,290,368 A | * | 9/1981 | Mazzini ...................... | 105/341 |

(List continued on next page.)

FOREIGN PATENT DOCUMENTS

| | | | | |
|---|---|---|---|---|
| BE | 550962 | * | 12/1959 | ................. 49/213 |
| DE | 2422280 | * | 6/1975 | ................. 49/209 |
| DE | G 85 09 717.9 | | 7/1985 | |
| EP | 0 492 743 A1 | | 7/1992 | |
| EP | 0 517 334 B1 | | 12/1992 | |
| GB | 1150067 | | 4/1969 | |
| IT | 624677 | * | 9/1961 | ................. 49/213 |

*Primary Examiner*—Alvin Chin-Shue
*Assistant Examiner*—Khoa Tran
(74) *Attorney, Agent, or Firm*—Altera Law Group, LLC

(57) ABSTRACT

A swivel-sliding door system for a vehicle having at least one door leaf situated in the vehicle wall in the closed state, and situated on the outside in front of the vehicle wall in the open state while leaving a door opening free. A drive as well as transverse and longitudinal guides are provided which enable a movement at the at least one door leaf transverse relative to the vehicle wall and along the vehicle wall, wherein the drive and the transverse and longitudinal guides are combined into one complete operating unit that can be mounted as one whole in the vehicle and be coupled to the at least one door leaf. The operating unit comprises a frame which, in assembled condition, is fixedly connected to the vehicle and an assembly which is movably provided in the frame and which comprises a drive motor for the door leaf movements. The frame may include a girder extending along the door opening and end flanges provided at the ends of the girder, wherein the movable assembly is movable along the end flanges, transversely to the vehicle wall and the girder, for executing a plug movement and wherein the drive motor effects both the plug movement and the longitudinal movement of the at least one door leaf along the vehicle wall.

23 Claims, 4 Drawing Sheets

U.S. PATENT DOCUMENTS

| | | | | |
|---|---|---|---|---|
| 4,503,638 A | * | 3/1985 | Schindehutte | 49/213 |
| 4,543,746 A | * | 10/1985 | Racca | 49/118 |
| 4,862,640 A | * | 9/1989 | Boyko et al. | 49/214 X |
| 4,932,715 A | * | 6/1990 | Kramer | 49/215 X |
| 5,077,938 A | * | 1/1992 | Moreuil | 49/362 |
| 5,253,452 A | * | 10/1993 | Goldbach | 49/213 X |
| 5,263,280 A | * | 11/1993 | Dilcher | 49/218 X |
| 5,271,181 A | * | 12/1993 | Pietro | 49/213 X |
| 5,483,769 A | * | 1/1996 | Zweili | 49/218 X |
| 5,893,236 A | * | 4/1999 | Krbec et al. | 49/118 |

* cited by examiner

SWIVEL-SLIDING DOOR SYSTEM FOR A VEHICLE

FIELD OF THE INVENTION

The invention relates to a swivel-sliding door system for a vehicle having at least one door leaf situated in the vehicle wall in the closed state, and situated on the outside in front of the vehicle wall in the open sate and leaving a door opening free under these circumstances, drive means, and transverse guide means and longitudinal guide means being provided which make possible a movement of the at least one door leaf transversely with respect to the vehicle wall and along the vehicle wall.

BACKGROUND OF THE INVENTION

Such swivel-sliding door systems have already been used for many years in, for instance, train carriages for passenger transportation. An example of a known swivel-sliding door system is described in European patent application 0517334.

A swivel-sliding door system should enable the above-described movements of the at least one door and should also provide a locking of the at least one door in the closed state which is such that the door cannot be opened by the action of air flows past the travelling carriage or by passengers leaning or pushing against the door. In addition, a simple construction which is as compact as possible and economically feasible is desired, with the difference between the portal opening and the required passage being as small as possible.

It is also desirable that the components used are maximally independent of the dimensions of the desired door opening, so that these components can be used for different carriages without modification, which enables a high degree of standardization. Also, the component parts of a swivel-sliding door system should preferably be able to be preassembled as much as possible, so that building-in and adjusting times in the carriage can be minimized.

SUMMARY OF THE INVENTION

The object of the invention is to provide an improved swivel-sliding door system meeting the above requirements. More generally, the object of the invention is to provide a safe, reliably operating, constructionally simple and robust, noise-poor, vibration-free and readily serviceable swivel-sliding door system. According to the invention, a swivel-sliding door system of the above type is characterized in that the drive means, the transverse guide means and the longitudinal guide means are combined into a complete operating unit that can be mounted as one whole in the vehicle by means of some suitable fasteners and can be coupled to the at least one door leaf, with the operating unit comprising a frame which, in mounted condition, is fixedly connected to the vehicle, and an assembly movably provided in the frame and comprising a drive motor for the door leaf movements.

BRIEF DESCRIPTION OF THE DRAWINGS

Hereinafter, the door drive will be specified with reference to the accompanying drawings of an exemplary embodiment.

DETAILED DESCRIPTION OF PREFERRED EMBODIMENTS

Figure 1:
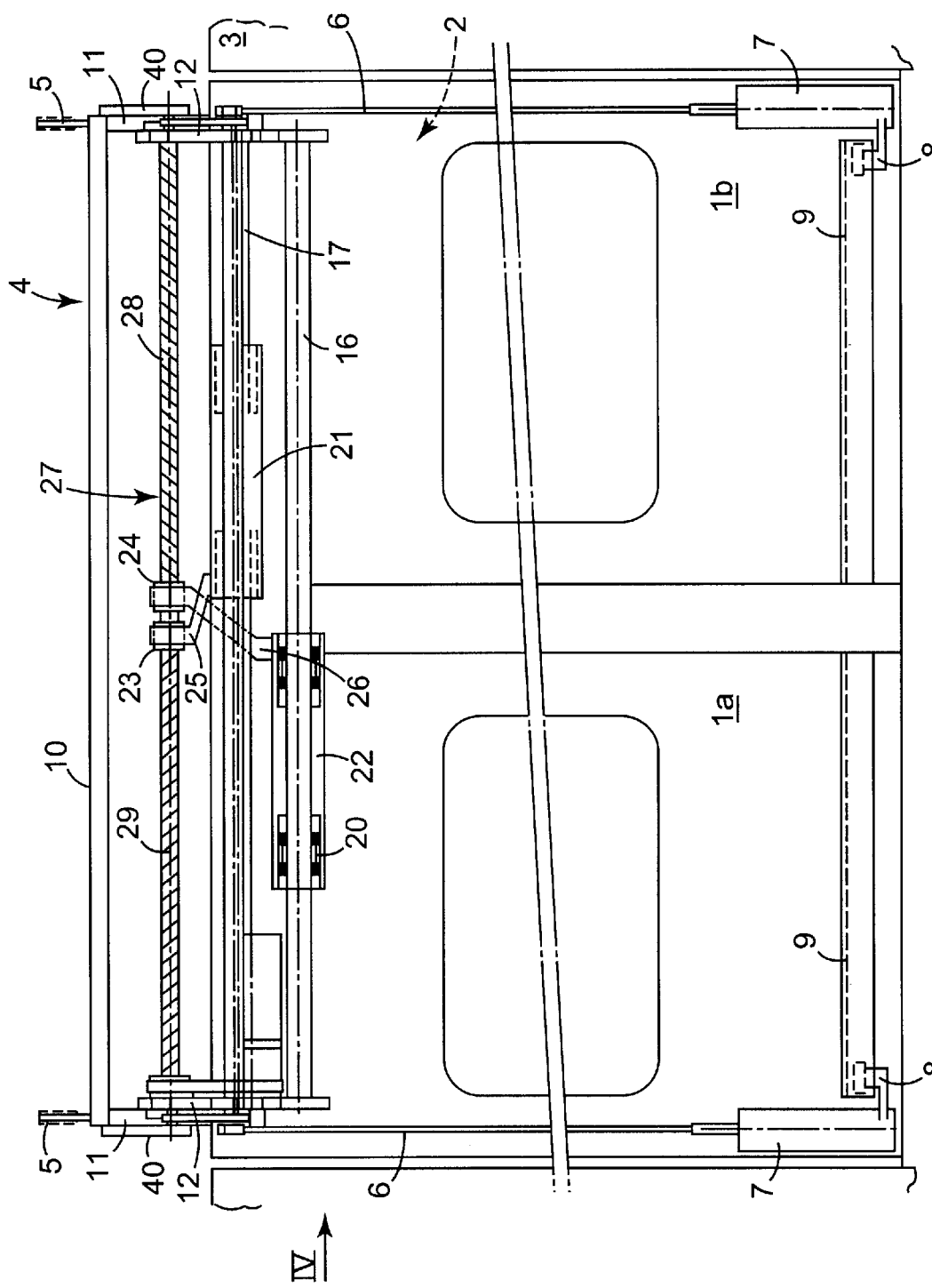
FIG. 1 diagrammatically shows, in rear view, an exemplary embodiment of a swivel-sliding door system according to the invention with two door leaves in the closed state.
Figure 2:
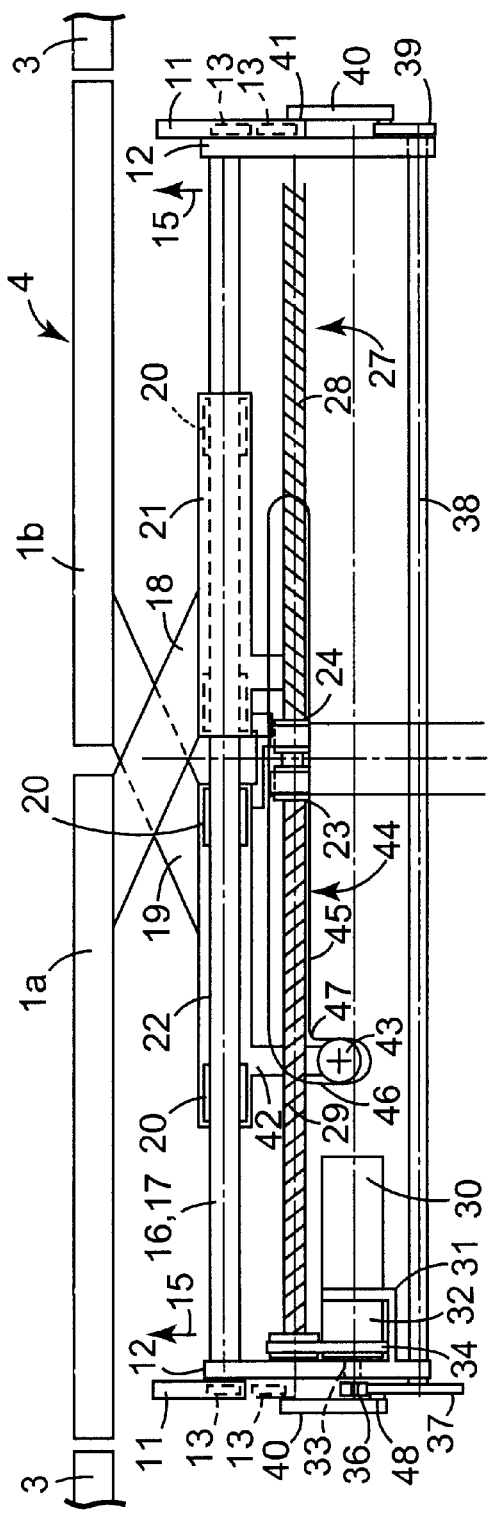
FIG. 2 diagrammatically shows the system of FIG. 1 in top plan view.

FIG. 1 diagrammatically shows a rear view, i.e. viewed from the interior of the vehicle, an example of a swivel-sliding door system according to the invention, and FIG. 2 shows the swivel-sliding door system of FIG. 1 in top plan view. It is observed that for the clarity, some parts in FIGS. 1 and 2 as well as in FIG. 3 have been slightly displaced relative to the situation shown in the end views of FIGS. 4–7. However, this does not make a difference for the description of the operation of the system shown.

FIG. 1 shows a swivel-sliding door system comprising two door leaves 1a,1b, jointly capable of closing or releasing an opening 2 in the wall 3 of the vehicle. It is observed that a swivel-sliding door system according to the invention can also be designed with only one door leaf. However, herein below, an exemplary embodiment having two door leaves will be described. As in conventional, the door leaves can be displaced with a plug movement from the closed position into a more outwardly located position and subsequently be slid laterally from that outward position along the wall of the vehicle so as to release the passage opening. Conversely, the door leaves which are in the entirely open position can be slid from the position along the outer wall of the vehicle into a position in front of the passage opening and subsequently, with a plug movement, be brought into a position in which the passage opening is closed.

In the examples shown, the operating means that can effect that the door execute the above-described movements and that the door leaves remain locked in the closed position as long as no command that the door leaves should be opened has been received, are mounted on the top side of the doors, as is usual. In principle, mounting on the bottom side is possible, yet unusual. According to the invention, the operating means comprise a drive motor, assembled together with a number of transmission members and guide means into one complete unit 4 that can be mounted in and dismounted from a vehicle as one whole. The unit 4 can be entirely preassembled and can be mounted in the vehicle by means of a number of bolts or like fasteners, such as the bolts 5. Then, the unit need only be coupled to the doors. As a result, mounting in the vehicle takes up very little time. At the top side, a direct coupling to the door leaves can be used, as will be described hereinbelow. At the bottom side, the door leaves should also be capable of being guided and swivelled outwards and inwards. For this purpose, a transmission mechanism known per se is used, comprising for each door leaf a vertical rod or tube 6 and a transmission device 7 with a swivel arm 8, the swivel arm 8 engaging a guide section 9 of the door leaf. A suitable transmission mechanism is for instance described in European patent application 0517334. The vertical rod or tube 6 has its top and coupled to a lever or the like of the operating unit, which can cause the rod or tube to move up and down vertically.

Figure 4:
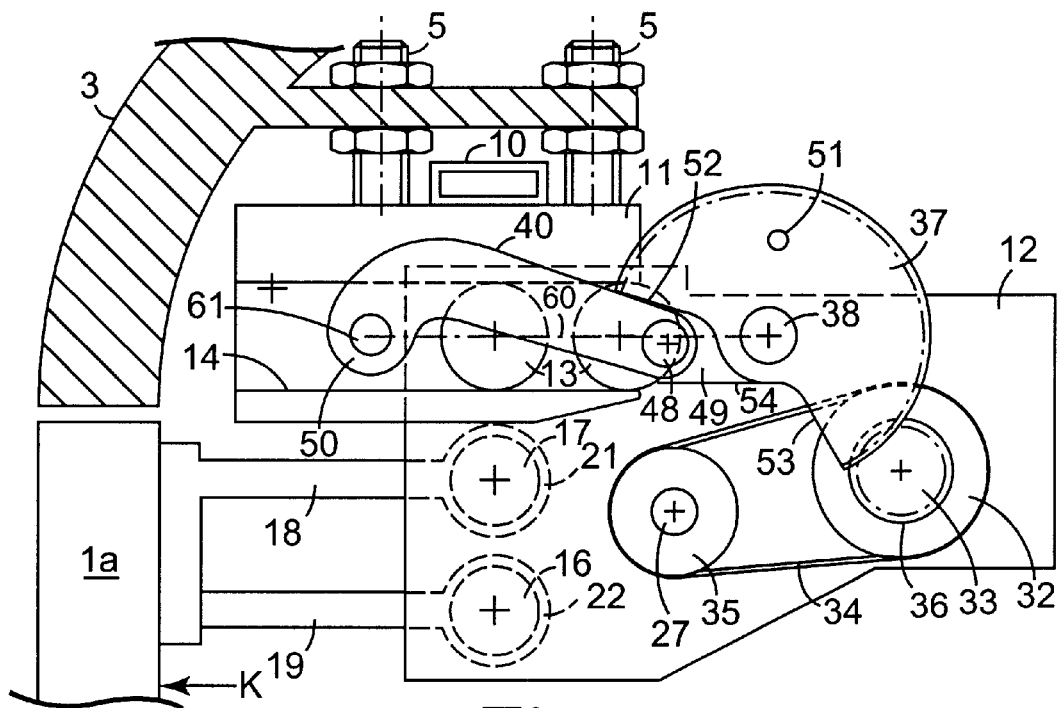
FIG. 4 is a view according to the arrow IV in FIG. 1.
Figure 5:
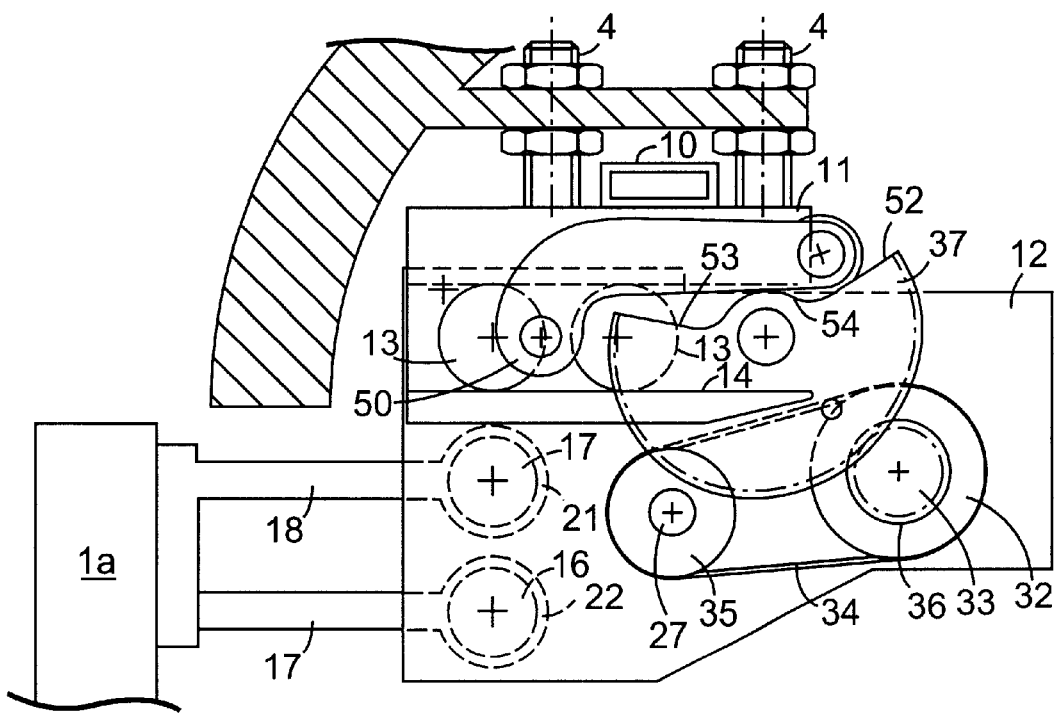
FIG. 5 is a view according to the arrow IV in FIG. 1 with the doors in the slid-out state.
Figure 6:
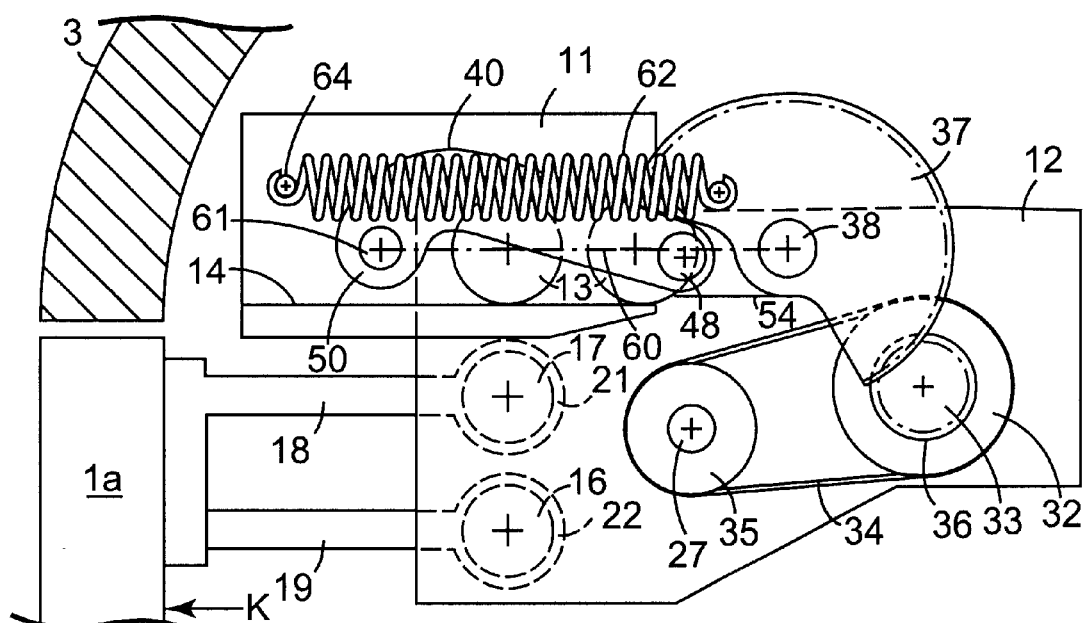
FIG. 6 is a view similar to that of FIG. 4, in which a closing spring is indicated.
Figure 7:
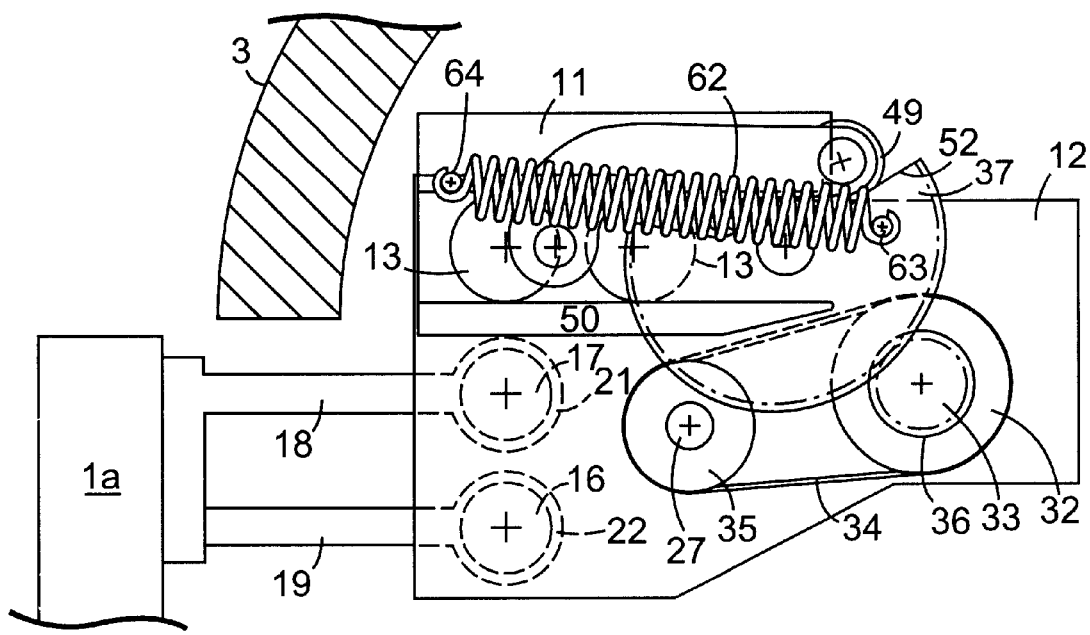
FIG. 7 is a view similar to that of FIG. 6, with the doors in the slid-out state.

The operating unit has a frame comprising a substantially horizontal girder 10 and two depending end flanges 11 provided at the ends of the girder. The end flanges 11 also serve as transverse guide member, as will be described in more detail hereinbelow. The girder may consist of a suitable strip or profiled beam or the like and comprises a curve plate for the control of the movement of the door leaves, which curve plate will be described in more detail hereinbelow. In FIGS. 4 and 5, a girder 10 in the form of a rectangular box girder is shown.

By means of the bolts 5, the frame is fixedly connected to the vehicle, as is also shown in FIGS. 4 and 5. The end flanges 11 each comprise a guide track, extending substantially transversely to the plane of the door leaves, for guiding a movement of assembly plates 12 that are slidable transversely to the vehicle wall relative to the end flanges. The assembly plates constitute, together with other elements for driving and guiding the door leaves to be further described, an assembly moveable in the frame transversely to the vehicle wall.

Figure 3:
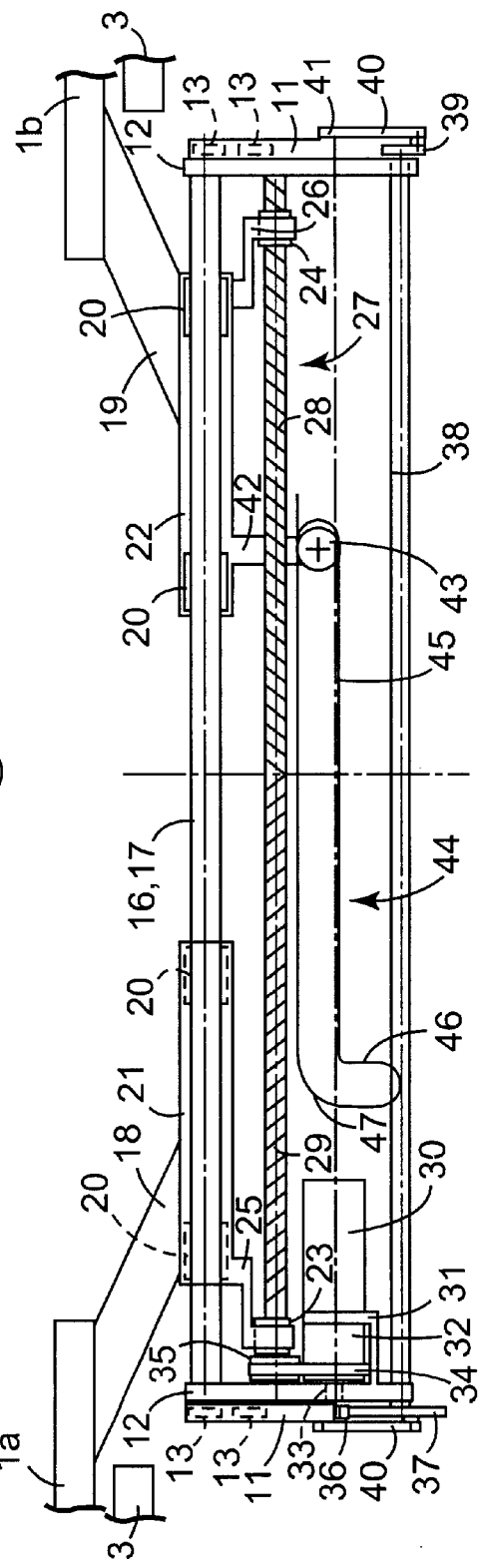
FIG. 3 is a view corresponding to that of FIG. 2 with the doors in the slid-out state.

In the example shown, the assembly plates 12 each comprise two rollers 13 capable of running in a guide slot 14 of the end flanges, as is clearly shown in FIGS. 4 and 5. This permits the assembly plates 12 to move from the position shown in FIG. 2 in outward direction relative to the end flanges or transverse guide members 11, as indicated in FIG. 2 by arrows 15. FIG. 2 shows the position of the assembly plates associated with the closed state of the door leaves, while FIG. 3 shows the position of the assembly plates associated with the open state of the door leaves. Extending between the assembly plates 12 are two carrying shafts 16, 17, mounted on the ends of the assembly plates. Each carrying shaft carries a support arm 18, 19, attached to a door 1a and 1b respectively. To this end, each support arm comprises a member that cooperates with the associated carrying shaft and is slidable over the carrying shaft, such as for instance a sleeve 21, 22 provided with ball circulating bushes 20 or the like.

Each support arm further comprises an auxiliary arm 25, 26 having a non-rotatably mounted spindle nut 23, 24. For this purpose, the auxiliary arms preferably comprise a fork fitting around the associated spindle nut, to simplify the assembling operation. The spindle nuts are each disposed around a spindle shaft extending between the assembly plates. In the example shown, a single spindle shaft 27 is used, one half of which has a left-handed pitch and the other half of which has a right-handed pitch. The spindle nuts each cooperate with one of the halves 28, 29 and have threades adapted thereto.

The position of the spindle nuts, and hence of the support arms, associated with the closed state, is shown in FIGS. 1 and 2. If, starting from that position, the spindle shaft 27 is rotated in the proper direction of rotation (to the right when viewed from the left end), the spindle nuts which, in the situation of FIG. 2, are closely spaced adjacent the center of the spindle shaft, will move apart in the direction of the ends of the spindle shaft. However, this is only possible if the door leaves are first plugged out, i.e. have been moved outside the plane of the vehicle wall.

For effecting the rotation of the spindle shaft and for effecting the plug movement, a single drive motor 30 is mounted.

The motor 30 forms part of the movable assembly of the operating unit 4. In the example shown, the motor is mounted at the left-hand assembly plate 12 by means of a motor support 31. The motor may be an electromotor, but, if so desired, may also be a hydraulic or pneumatic motor. The motor has a rotating output shaft, coupled to a planet gear case 32 that is rotatably mounted on the assembly plate. The planet gear case has a rotatable housing, in this example provided with teeth, as well as a rotatable output shaft 33. By means of a toothed belt 34, the housing of the planet gear case 32 is coupled to a toothed belt pulley 35 mounted on the spindle shaft 27. Further, on the output shaft 33 of the planet gear case, which output shaft extends through the assembly plate 12, a gear 36 is mounted engaging a gear 37, which, in the example shown, is constructed as a gear segment. The gear segment 37 is mounted on an end of a shaft 38 extending between the two assembly plates 12 and at either end bearing-mounted in the assembly plates and, in this example, also extending through the assembly plates at either end. The shaft 38 has an important function for effecting the plug movement and is therefore referred to as 'plug shaft'. The right-hand end of the plug shaft carries a lever 39 which is pivotally coupled to one end of a second lever 40. At 41, the other end of the lever 40 is pivotally coupled to the frame, in this case to the right-hand end flange 11. In a manner similar to that of the lever 39, the gear segment is pivotally coupled, via a lever 40, to the left-hand end flange 11. In the example shown, the two levers 40 are of identically curved design, but this is not required.

From the foregoing, it may appear that the shaft of the planet gear case drives the plug shaft 38 via the gear segment 37, while the housing of the planet gear case 32 drives the spindle shaft via the belt 34. As is known, the operation of such planet gear case is such that the shaft rotates if the housing is retained and that the housing rotates in the opposite direction if the shaft is retained. To provide that the plug shaft and the spindle shaft are driven in the desired order, at least one of the door leaves or a member connected thereto comprises a cam moving along a guide. In the example shown, the sleeve 22 connected to the right-hand door leaf comprises a cam arm 42 carrying a roller 43. See FIGS. 2 and 3. The roller 43 extends into a slot 44 provided in a curve plate. The curve plate may be attached to the girder 10, yet may also form a part of the girder 10. The curve may also consist of two ribs between which the cam is guided or of a single rib around which the cam slips or the like. The slot 44 comprises two straight, substantially right-angled sections 45, 46. The section 45 is the longer section and extends parallel to the spindle shaft. The section 46 is the shorter section and extends transversely to the spindle shaft, parallel to the levers 40. The two sections are interconnected by a section 47 bent through 90°.

If, starting from the situation shown in FIG. 2, the motor 30 is energized for opening the doors, the spindle shaft 27 is first blocked. As it is, the sleeve 22 is retained in the slot section 46 by the came roller 43 in such a manner that a movement of the spindle nut 24 along the spindle shaft, and hence a movement of the sleeve along the support arm, is not possible. As the spindle shaft is blocked, the housing of the gear case 22 is retained and the gear 36 is driven by the shaft 33 of the gear case. Via the gear segment 37, the gear 36 drives the plug shaft 38 and the lever 39.

For a further explanation of the consequences of the drive of the gear segment 37, reference is made to FIG. 4 and 5, showing a view of the operating mechanism according to the arrow IV in FIG. 1

FIG. 4 shows the left-hand assembly plate 12 and the gear 36 mounted on the shaft 33 of the planet gear case 32. For clarity's sake, the planet gear case itself, which in this example is in fact located behind the assembly plate, is shown as well, together with the drive belt 34 and the pulley 35 mounted on the spindle shaft 27. The gear 36 engages the gear segment 37. The gear segment 37 is pivotally coupled, at 48, to the lever 40. To this end, a separate fastening strip 49 provided on the gear or gear segment is used in this example, but the lever 40 could also be directly coupled to the gear or gear segment 37. At 61, the other end 50 of the lever 40, in this example consisting of a bent strip, is pivotally connected to the end flange 11 of the frame. If, starting from the situation shown in FIG. 4, in which the doors are closed, the gear 36 rotates leftwards, the gear segment 37 is rotated rightwards and a pull is exerted on the lever 40. As the end 50 of the lever which end is remote from the gear segment 37 is attached to the fixed end flange 11, the pull results in that the assembly plate 12 is pulled towards the end flange 11. This involves the roller s 13 rolling along the guide slot or guideway 14. The same movement takes place at the other end of the operating unit, because on that side, the lever 39 is driven by the plug shaft 38 and drives a substantially identically curved lever 40 again. As the assembly plates 12 are connected to the carrying shafts and to the spindle shaft, the door leaves move transversely to the vehicle wall 3 in outward direction, until the position shown in FIG. 5 is reached. This also involves the cam roller 43 moving through the transverse section 46 of the fixed slot 44. As soon as the cam roller is at the level of the longitudinal slot section 45 of the slot 44, a further movement transverse to the vehicle wall is no longer possible. Hence, the shaft 33 of the planet gear case is blocked and the driving force of the motor is now transmitted to the spindle shaft. The spindle shaft is free to rotate, because the cam roller 43 now extends into the longitudinal slot section 45, which is parallel to the spindle shaft. The sleeve 22, and hence the nut 24 and also the sleeve 21 with the nut 23, can now move apart along the carrying shafts and the spindle shaft. This involves the door leaves sliding on the outside along the vehicle wall into the open state shown in FIG. 3. The closing of the doors takes place in the reverse order of movement. For the sake of completeness, FIGS. 4 and 5 further indicate, at 51, the place where the vertical tube or rod 6 is coupled to the gear segment. At the other end, the lever 39 is correspondingly connected to the associated vertical rod 6.

The paths of movement in transverse and longitudinal direction can be limited in various manners. For this purpose, use can for instance be made of the came roller 43 and the curse slot 44. Also, stops can be provided at suitable locations, for instance on the carrying shafts 16, 17 for the longitudinal movement and on the assembly plates 12 and/or the end flanges or transverse guide members 11. In the example shown, a limitation for the transverse movement (the plug movement) is obtained by mounting the gear segment 37 and the lever 40 substantially in the same plane. In the closed state of the door leaves, the gear segment has one, substantially radial limiting edge 52 abutting against the top edge of the lever 40 (FIG. 4) while in the open state the lever abuts against the other substantially radial limiting edge 53 and/or the central part 54 of the gear segment. In both situations, a continuing movement is not possible.

Preferably, the so-called overcenter/closing principle is also used for the closing position. The overcenter/closing principle is known per se and implies that the elements of a locking mechanism are moved in the closing direction just beyond a dead center that corresponds to the closing position, so that a force exerted in the opening direction on the locked member (in this case a door leaf) merely results in that this member is retained in the closing position more strongly. In the construction shown, the overcenter/closing principle is used in that when the door leaves are being closed, the pivoting point 48 moves to a position slightly beyond the line 60, connecting the pivoting points 38 (the center of the gear segment 37) and 61 (the fixed end of the lever 40). As is readily shown in FIGS. 4 and 6, an outward force K exerted on the door leaf 1a, which may be a suction force or a force exerted by a passenger leaning against the door leaf, cannot result in that the gear segment rotates to the right. Indeed, the force K acts in horizontal direction in the point 38 along a line lying above the point 48 and can only push the point 48 downwards, i.e. in the closing direction.

To effect that the elements 37 and 40 remain in the closing position lying beyond the dead center (in which the points 38, 48 and 61 are in line) also during vibrations and the like, a spring, in this example a pull spring 62, is used, mounted between a point 63 on the gear segment and a fixed point 64 on the end flange 11. These points are chosen so that the spring 62 always pulls the gear segment in the closing direction. This has the additional advantage that in the event of a power failure, the door leaves can simply be brought into the closed state by hand and that then, too, the gear segment and the lever are pulled and maintained in the overcenter/closing position by the spring force of the spring 62. It is observed that at the other end of the operating unit for the levers 39 and 40, the same overcenter/closing principle is used. If so desired, a spring similar to the spring 62 can be applied.

It is observed that after the foregoing, various modifications readily occur to a person skilled in the art. For instance, two spindle shafts may be used rather than one combined shaft. Also, instead of a gear segment 37, a complete gear or a gear rack may be used. Further, as observed, the invention is applicable to a single door leaf as well as to a set of door leaves. Further, the guiding of the movement of the assembly plates along the end flanges may be realized in a different manner, for instance by means of dovetail-shaped grooves and ribs fitting therein or the like. These and similar modifications are understood to fall within the framework of the invention.

What is claimed is:

1. A swivel-sliding door system for a vehicle having at least one door leaf, said system being configured to be situated in a vehicle wall having an opening, wherein said at least one door leaf is movable from a first closed plugged position to a second open unplugged position where said door leaf is generally parallel to but situated outwardly from the vehicle wall and slideable transversely therealong, the door system further comprising:

an operating unit having a first portion that is adapted to be mounted to the vehicle;

a second portion of said operating unit coupled to said at least one door leaf, wherein
  said first portion of said operating unit comprises a frame sized to be received within the space defined by an opening in said vehicle wall which, in assembled condition, is adapted to be fixedly connected to the vehicle, and wherein said second portion includes:

a drive motor;

a moveable assembly, slideably attached to said first portion and between said first portion and said at least one door leaf, and said assembly including said drive motor with said drive motor being affixed to said moveable assembly so that said drive motor and assembly together move between said first position when said one door leaf is in said closed position, and said second position where said one door leaf is in an open position, wherein movement between said first and second positions being generally orthogonal to the movement of at least one door leaf when they slide transversely.

2. A swivel-sliding door system according to claim 1, further comprising means for effecting the plug movement of the at least one door leaf.

3. A swivel-sliding door system according to claim 2 further comprising an assembly plate, and end flange and at least one driven lever member pivotally mounted in said assembly plate and being pivotally connected to one end of said lever arm whose other end is pivotally connected to said end flange in cooperation with the assembly plate.

4. A system according to claim 1, further including a spindle shaft, driven by said motor, said motor having a drive shaft generally parallel to said spindle shaft, said spindle shaft being carried within said moveable assembly, a drive linkage connected between the drive motor and said spindle shaft said transmission providing a generally orthogonal path between said parallel drive and spindle shafts whereby said assembly, drive motor and spindle shafts move together along a path generally orthogonal to the movement of said door leafs as they slide from open and closed positions.

5. A swivel-sliding door system according to claim 4, wherein on lever member comprises a gear member eccentrically coupled to a corresponding lever arm.

6. A swivel-sliding door system according to claim 5, wherein the gear member is a gear segment having two radial end edges, wherein at least one of said radial end edges defines an end position of the plug movement.

7. A swivel-sliding door system according to claim 6, wherein one of the radial end edges in the closed position of the at least one door leaf defines a final position of the plug movement by the relevant end edge abutting the lever arm.

8. A swivel-sliding door system according to claim 7, wherein the lever member and the lever arm in the closed position of the at least one door leaf are situated beyond a dead center.

9. A swivel-sliding door system according to claim 8, wherein a spring is provided for acting on said lever member, said spring urging and maintaining the lever member in the closed position beyond the dead center.

10. A system according to claim 1 wherein said at least one door leaf includes two opposed leaves, support arms extending from said leaves to said spindle shaft, and where said spindle shaft includes a first portion with a right hand thread and second portion with a left hand thread, said arms being connected to said first and second portion of said spindle shaft to provide opposite movement of the leaves in response to rotation of the spindle shaft and wherein said drive motor has a drive shaft, said drive shaft being oriented in a plane generally parallel to said transverse movement of the doors.

11. A system according to claim 10 wherein said threads meet at approximately the midpoint of the spindle shaft.

12. A system according to claim 1, further including a spindle shaft, driven by said motor for lateral movement of the doors and a plug shaft for movement of the doors generally transversely to the lateral movement, from plugged in and unplugged out positions, wherein said motor includes a drive shaft, and wherein said drive shaft is in parallel alignment with the said spindle and plug shafts and is situated between said shafts.

13. A swivel-sliding door system according to claim 12, wherein the frame comprises a girder extending along the door opening and end flanges provided at the ends of the girder, wherein the assembly is movable along the end flanges, transversely to the vehicle wall and the girder, for executing a plug movement and wherein the drive motor effects both the plug movement and the longitudinal movement of the at least one door leaf along the vehicle wall.

14. A swivel-sliding door system according to claim 1, including a planet gear case and a central output shaft and wherein the drive motor is coupled to a planet gear case and a central output shaft.

15. A swivel-sliding door system according to claim 14, wherein the housing of the planet gear case is coupled to said at least one spindle shaft and wherein said central output shaft causes the plug movement.

16. A swivel-sliding door system according to claim 1, wherein said frame further includes a curve plate, a cam track and cam member, said cam track forms a path to be followed by said cam member cooperating with the cam track, said path comprising a first straight section extending substantially parallel to the plug movement and a second straight section connecting to the first section by a section turned through 90°, said second extending substantially parallel to the longitudinal movement of the at least one door leaf, wherein the cam member is fixedly connected to the door leaf.

17. A swivel-sliding door system according to claim 16, wherein the cam member is provided on a cam arm mounted on a support arm.

18. A system according to claim 1, further including a spindle shaft, driven by said motor, said motor having a drive shaft generally parallel to said spindle shaft, said spindle shaft being carried within said moveable assembly, a drive linkage connected between the drive motor and said spindle shaft said transmission providing a generally orthogonal path between said parallel driven and spindle shafts whereby said assembly, drive motor and spindle shafts move together along a path generally orthogonal to the movement of said door leafs as they slide from open and closed positions.

19. A swivel-sliding door system according to claim 1, wherein said moveable assembly further comprises a set of assembley plates that cooperate with the end flanges and are slidable along the end flanges for making the plug movement, between which assembly plates extend at least one rotatable spindle shaft having a spindle nut coupled to a door leaf, for each door leaf a carrying shaft having a support arm slidable along the carring shaft, and a plug shaft for effecting the plug movement.

20. A swivel-sliding door system for a vehicle having at least one door leaf, wherein said at least one door leaf is moveable from a first closed plugged position to a second open unplugged position where said door leaf in the open position is generally parallel to but situated outwardly from the vehicle wall and slideable transversely therealong, the door system comprising an operating unit having a first position adapted to be mounted to the vehicle; and a second portion coupled to said at least one door leaf, wherein said first portion of said operating unit is sized to be received within the space defined by an opening in said vehicle wall, and is adapted to be fixedly connected to the vehicle, and wherein said second portion includes:

a drive motor a moveable assembly, slideably attached to said first portion and between said first portion and said at least one door leaf, and said assembly including said drive motor and said assembly together with said drive motor being affixed to said moveable assembly so that said drive motor and assemble together move between a first position where said one door leaf is in said closed position, to a second position when said one door leaf is in an open position wherein movement of said assembly between said first and second positions being generally orthogonal to the movement of the door leafs when they slide transversely.

21. A system according to claim 20, further including a spindle shaft, driven by said motor, said motor having a drive shaft generally parallel to said spindle shaft, said spindle shaft being carried within said moveable assembly, a transmission connected between the drive motor and said spindle shaft, said transmission providing a generally orthogonal path between said parallel drive and spindle shafts.

22. A system according to claim 20, further including a carrying shaft affixed to said moveable assembly, a support arm having an aperture sized to receive said carrying shaft, said support arm extending from said at least one door leaf to said carrying shaft, so that, said at least one door leaf is supported and driven by said support arm.

23. A swivel-sliding door system for a vehicle having an external wall surface and at least one door leaf situated flush with a vehicle wall surface in a closed position, and situated outside said wall surface in an open position while leaving a door opening unobstructed, wherein the at least one door leaf follows a first transverse path from said open position, then transversely relative to the vehicle wall and along and outside of the vehicle wall, to stop point in front of but spaced from said door opening and then moving to a closed plugged position whereby the leaf is fitted to and in contact with said opening, by a plugging movement from said stop point and then in a direction orthogonal of said transverse movement to plugged position, the door system comprising:

an operating unit that is mounted as whole by fasteners in the vehicle and being coupled to the at least one door leaf, wherein the operating unit comprises a fixed frame which, in assembled condition, is fixedly connected to the vehicle in said door opening, and a moveable assembly which is movably provided in the frame, and drive motor for powering door leaf movements, said assembly and drive motor together moving with said leaf in said orthogonal direction when said leaf is moved in and out of said plugged position.

* * * * *